Nov. 19, 1935.    L. A. KOCH, JR    2,021,364
EXTERNAL AND SELF COOLED GENERATOR
Original Filed Nov. 5, 1932    2 Sheets-Sheet 1

LOUIS A. KOCH JR.    Inventor

John L. Milton,
By
    Attorney

Nov. 19, 1935.  L. A. KOCH, JR  2,021,364
EXTERNAL AND SELF COOLED GENERATOR
Original Filed Nov. 5, 1932  2 Sheets-Sheet 2

LOUIS A. KOCH JR. *Inventor*

By *John L. Milton*

*Attorney*

Patented Nov. 19, 1935

2,021,364

UNITED STATES PATENT OFFICE 2,021,364

EXTERNAL AND SELF COOLED GENERATOR

Louis A. Koch, Jr., Louisville, Ky.

Application November 5, 1932, Serial No. 641,481
Renewed May 2, 1934

11 Claims. (Cl. 171—252)

This invention relates to means for increasing the watt hour capacity of dynamo-electric machines to withstand continued overload without destruction and in particular to the air cooling of dynamos employed on automotive vehicles.

The object of this invention is the production of an inexpensive and efficient means for providing standard automotive generators with means to prevent their windings, commutator and brushes from being destroyed by the excessive continuous loads that are being placed upon them by reason of added accessories, equipment and changing conditions under which they are called upon to operate.

It is well known to those of the automotive industry that the vendors of equipment, especially those that pertain to the electrical apparatus, have been forced to supply products at even decreasing prices, which has resulted in skimping of materials and workmanship and in many and increasing instances they have been decreased to such an extent that on continuous operation with the added loads of horns, windshield wipers, radio, heaters, et cetera, excessive heating ensues, and to an extent that the wires, commutator, et cetera, are impaired, if not destroyed. Free wheeling and automatic clutches are also contributors to the growing difficulties as the engines are permitted to "idle" for an increased percentage of travel and thereby reduce the watt hour output of the generator, which causes them to be additionally taxed when they are at generating speeds. Present day operation of trucks with trailers, delivery wagons making frequent stops and "cruising" speeds of police cars all reduce the generator's ability, under these operating conditions, to provide the desired current.

While air cooling of dynamo-electric machinery for certain classes of service is a well known expedient, it has heretofore not been effectively adopted for the automotive industry. There are many obvious reasons for this. In the first place the generators have been of completely enclosed design, this is in part due to inherited custom, dating back to the time when price was not such a factor and auxiliary equipment had not asserted itself with abnormal demands on the generator. Again these generators have been so compactly designed that ordinary expedients to effect air cooling were prohibitive either from the standpoint of effectiveness or cost of production. Another barrier to air cooling resides in the necessity for preventing foreign material from becoming entangled with the rapidly revolving armature. Again for dependable operation of automotive generators, it is necessary to devise efficient and inexpensive means to exclude water. Still another advantage resulting from the continued introduction of cleaned air into the generator resides in removing carbon and copper dust resulting from wear of the brushes on the commutator.

The purveyors of generators to the automotive industry are few in numbers and occupy such powerful commercial positions that the public is forced to buy automotive vehicles with incompetent generators or pay an exorbitant price for a reliable one, therefore, an outstanding object of this invention is to provide the individual owner with dependable inexpensive means for converting standard generators into effectively air cooled ones without rebuilding or even rewinding same and further, in many cases where the maximum watt hour capacity is not required, effective air cooling can be provided without even disassembling the heads or bearings from the field yoke.

Drawings

Figure 1 represents a partial side elevation of an internal combustion engine on which is installed a standard generator, shown partially cut away to expose the armature and the drive end bearing in cross-section.

Fig. 2 also represents a partial side elevation of an engine equipped with a generator in modified form.

Specification

Figure 1:
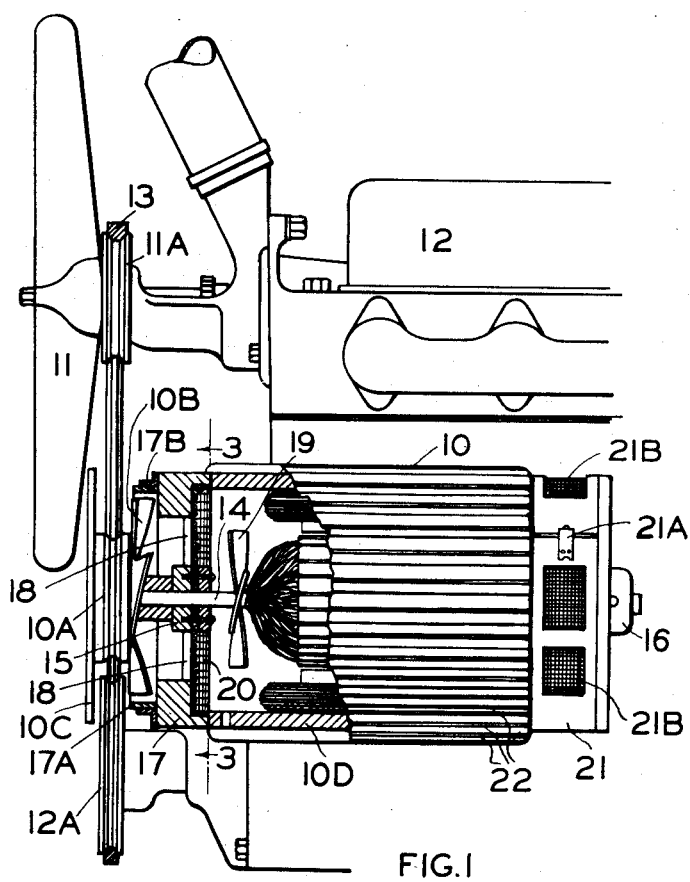

Numeral 10 indicates an electric generator, 11 a radiator cooling fan, both of which are attached to and operated by internal combustion engine 12 by belt 13 in the conventional way, there being pulley 12A attached to the main crank shaft of the engine, pulley 11A fixed on to the shaft that operates the radiator fan, and special pulley 10A fixed on to shaft 14 of the generator mounted in bearings 15 and 16. This shaft is the armature shaft on which are mounted the windings, laminæ and commutator all in a conventional way.

Bearing 15 is a part of end housing 17 which is altered to provide openings 18—18 to admit air currents locally created by fan blades 10B which are preferably made integrally with pulley 10A, also by special fan 19 fixed to shaft 14 and disposed between the bearing and the windings. Between these fans is a suitable wall of foraminous material 20 to produce an air filter medium which is to be coated with an adhesive such as oil for the purpose of arresting foreign particles from the air as it passes to the generator. Pulley 10A is fashioned with a disc 10C to intercept water and certain heavy particles that may be encountered while operating, as a means of reducing the amount of work to be performed by filter 20.

Blades 19B are preferably disposed within a shroud 17A which is attached to angles 17B, these in turn being attached to housing 17. This attaching is preferably effected by electric spot welding, however other obvious means can be utilized. This shroud performs the double function of protecting these blades and also for directing the air currents created by same to the interior of the generator, and also to function as a water shed.

On the other end of the generator provision for the escapement of the heated air is provided by making openings in "window strap" 21 which is otherwise of conventional design and is detachable by clasp 21A. These openings are covered with a relatively fine mesh wire as shown by 21B.

Figure 8:
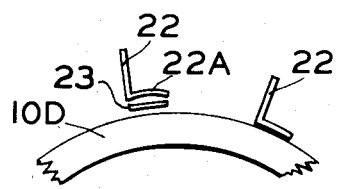
Fig. 8 represents a section of the generator yoke with one of the added parts in place and other unattached parts, which constitute said added part.
Figure 6:
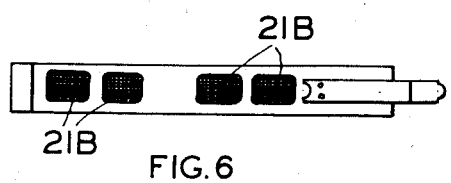
Figs. 6 and 7 are respectively top and side elevational views of the commutator "window strap".
Figure 7:
Figure 4:
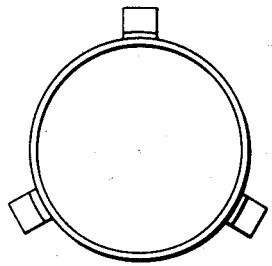
Figs. 4 and 5 are details of a fan housing attached to the outside of the drive end bearing.
Figure 5:
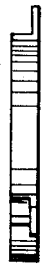
Figure 3:
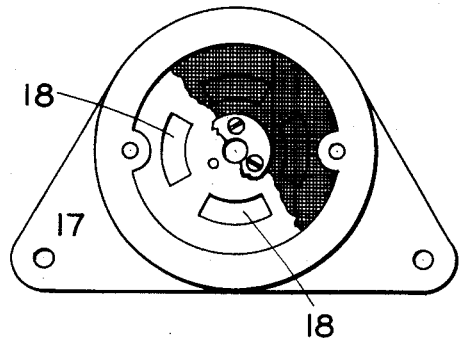
Fig. 3 is an end view of the drive end bearing along line 3—3 of Fig. 1.

To the yoke or housing 10D are attached a plurality of fins 22 for the purpose of increasing the radiating area of the generator and thereby materially assisting in maintaining a low temperature for the entire body of said generator. The method of attaching fins is shown on enlarged scale in Fig. 8. This method preferably consists of shaping the base 22A of fin 22 on an arc of a lesser diameter than the arc of yoke 10D as shown and then locating the fins at selected positions with a strip 23 of tin or other soft metal of approximately the same dimensions as the contacting surface of 22A between the fin and the yoke, holding it in place during the electric welding process, which is preferably accomplished by connecting the yoke to one terminal of the electric welder and then applying the other terminal to the top surface of 22A applying pressure ahead of the application of the electric current, or this can be accomplished by arc welding. It will be noted that the thin layer 23 will adjust itself to the applied forces and completely fill the irregular surfaces of 22A and 10B by reason of the spring pressure of 22A and the welding heat. This is for the purpose of providing a practically perfect contact surface of effected parts for the transmission of the generator's heat to fin 22.

*Operation*

In operation the air currents from the radiator fan are forced to take up an appreciable amount of heat from the generator housing by reason of the increased radiating surface provided by fins 22. In some cases this is sufficient for increasing the ability of the generator to carry a partial overload. In other cases where the maximum output of the generator is desired to be maintained without destruction to the windings, commutator and brushes, it has been found necessary to add the fans 10B and 19 and permit the air to escape through opening such as 21B. In this way the generator is enabled to continuously operate satisfactorily at its full volt ampere capacity, the limiting factors of this new arrangement being determined by the capacity of the commutator and brushes of the present standard generator to handle the generated currents without destructive arcing and then again the operation of the generator is improved by reason of the air currents carrying away the carbon and copper particles due to mechanical and electrical erosion.

*Modification*

Figure 2:
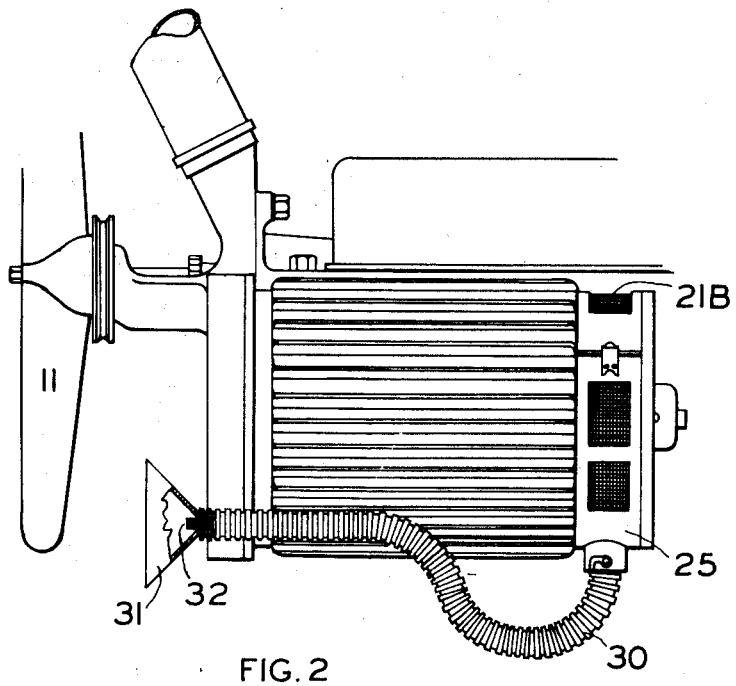

In the modified structure shown in Fig. 2, numeral 30 represents a conduit, one end of which communicates with the interior of the generator, connection being made to the window strap 21 by means of a bayonet joint, while the other end terminates in a collector of funnel shape, the bell mouth of which is placed in the direct draft of radiator fan 11 while the throat of the collector is equipped with the readily removable filter medium 32.

In the modified structure air currents collected enter 31 and are forced through the conduit and in to the generator from the bottom section, the air currents traveling directly across the commutator and passing out of openings 21B. The generator in this construction could be equipped with fins which also adds to the generator's capacity for safely carrying a volt ampere overload that would otherwise destroy it.

*Scope*

Many modifications and changes in the application of the parts and principles herein disclosed can be indulged without departing from the spirit of this invention therefore I wish to be limited only by the appended claims.

I claim:

1. Means for cooling a generator having a cylindrical housing, vented ends therefor and an armature and shaft journalled in said ends, heat dissipating members of metal on the periphery of said housing to increase the radiating surface of same, a fan on the armature shaft exteriorly of the housing end and a fan on the armature shaft interiorly of the housing end, said fans cooperating to drive air longitudinally of the housing and out of the opposite end thereof.

2. Means for cooling a generator having a cylindrical housing, vented ends therefor, an armature and shaft journalled in said ends, heat dissipating members of metal on the periphery of said housing to increase the radiating surface of same, a fan carried on the armature shaft of said generator exteriorly of said housing, a fan on said shaft interiorly of the housing end, a filter medium, said fans cooperating to force air through the filter medium, thereby expelling heated air from the housing.

3. An air-cooled dynamo, comprising an enclosing housing for said dynamo, an external fan and an internal fan each operated as a part of said dynamo, inlet apertures adjacent one end of said housing between said fans, and an outlet adjacent the other end of said housing, and an air filter medium located at the inlet apertures.

4. Means for cooling a generator having a cylindrical housing, vented ends therefor and an armature and shaft journalled in said ends, a filter medium carried on said housing, a fan on the armature shaft exteriorly of said filter, a fan on the armature shaft interiorly of said filter, said fans being adapted to force the filtered air longitudinally of the housing.

5. Means for cooling a generator having a cylindrical housing, vented ends therefor and an armature and shaft journalled in said ends, a filter medium carried on said housing around the armature shaft. a centrifugal separator on the armature shaft exteriorly of said filter, said separator being mounted independently of said filter and a fan on the armature shaft interiorly of said filter, said fan being adapted to force the filtered air longitudinally of the housing.

6. Means for cooling a generator having a cylindrical housing, vented ends therefor and an armature and shaft journalled in said ends, a filter medium carried on said housing around the armature shaft, a centrifugal separator and a fan both mounted on the armature shaft exteriorly of said filter, said separator being mounted independently of the filter, said fan being adapted to force the filtered air longitudinally of the housing.

7. Means for cooling a generator having a cylindrical housing, vented ends therefor, and an armature and shaft journaled in said ends, means for rotating said armature, a filter medium carried on said generator, means for forcing air currents through said filter and longitudinally of the housing, said means for rotating the armature being disposed sufficiently close to said filter to function as a centrifugal separator to force coarse particles from said currents before passing into said filter.

8. Means for cooling a generator having a cylindrical housing, vented ends therefor, and an armature and shaft journaled in said ends, means for rotating said armature, a filter medium carried on said generator, means for forcing air currents through said filter and longitudinally of the housing, said means for rotating the armature being utilized to function as a centrifugal separator to force particles from said currents before passing into said filter.

9. Means for cooling a dynamo-electric machine having a housing, vented ends therefor, and an armature and shaft journalled in said ends, means for rotating said armature, a filter medium carried on said machine, a centrifugal separator independently mounted in advance of the filter medium, means for forcing air currents through said filter and longitudinally of the housing, said means for rotating the armature being utilized to actuate the centrifugal separator to force particles from said currents before passing into said filter.

10. Means for cooling a dynamo-electric machine having a housing, vented ends therefor, and an armature and shaft journalled in said ends, means for rotating said armature, a filter medium carried on said machine, a centrifugal separator independently mounted in advance of the filter medium, means for forcing air currents longitudinally of the housing, said rotating armature being utilized to actuate the centrifugal separator to force particles from said currents before passing into said housing via said filter.

11. Means for cooling a dynamo-electric machine having a housing, vented ends therefor, and an armature and shaft journaled in said ends, means for rotating said armature, a member attached to said means, a filter medium carried on said machine, means for forcing air currents longitudinally of the housing, said means for rotating the armature actuating the said attached member to centrifugally force particles from said currents before passing into said housing via said filter.

LOUIS A. KOCH, Jr.